Patented Oct. 5, 1926.

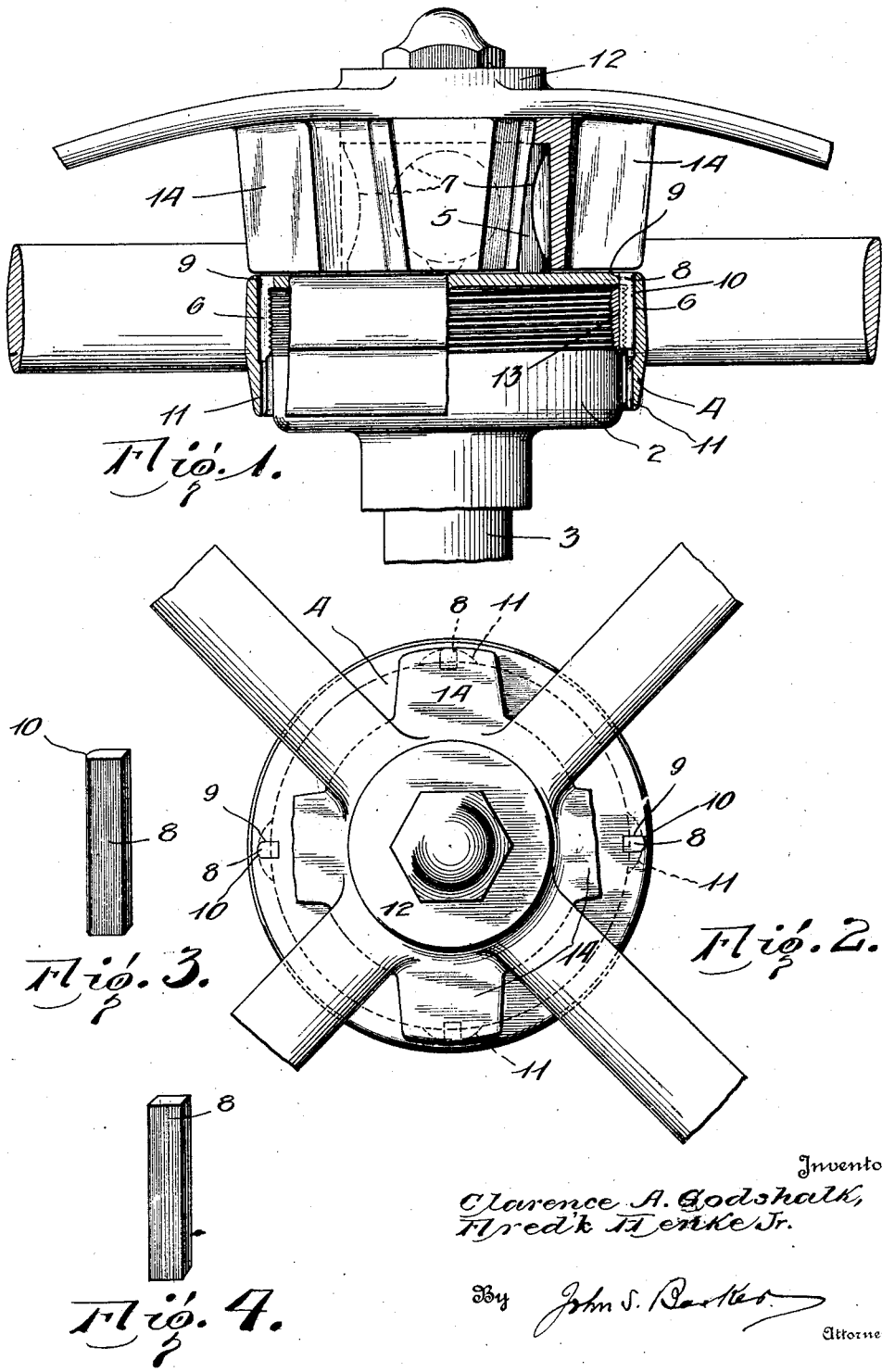

1,601,912

UNITED STATES PATENT OFFICE.

CLARENCE A. GODSHALK AND FREDERICK HENKE, JR., OF PHILADELPHIA, PENNSYLVANIA, ASSIGNORS TO FOX AUTOMOTIVE PRODUCTS CORPORATION, OF PHILADELPHIA, PENNSYLVANIA, A CORPORATION OF DELAWARE.

MEANS FOR SECURING A REMOVABLE CAP TO A GEAR CASE.

Application filed December 15, 1922. Serial No. 607,159.

In application Number 601,367, filed November 16, 1922, by Clarence A. Godshalk, which application has since matured into Patent 1,578,424, dated March 30, 1926, there are described and illustrated means for and a method of securing against rotation the parts of gear casings, illustrating such invention as applied to the gear case of a Ford-type steering mechanism for automobiles. The present invention relates to the same subject matter and has for its object to improve the locking or securing means, as will be hereinafter pointed out.

In the accompanying drawings—

Figure 1 is an elevation, partly in section, of the case and cap enclosing the steering gear of an automobile of the "Ford" type, the cap being constructed to serve as a part of a lock for the steering wheel, to which our invention is applied.

Fig. 2 is a top plan view of the parts illustrated in Fig. 1.

Fig. 3 is a perspective view of one of the locking pins that we employ in carrying out our invention.

Fig. 4 is a perspective view of another form of such locking pin.

Referring to the drawings, 2 designates the case located at the top of the steering post 3, that encloses and protects the steering gear of a "Ford" type steering mechanism for an automobile, and 4, the cap that closes the upper open end of the case, these two parts being united by screw threads. The cap is formed with an attachment 5, that constitutes part of a steering-wheel locking mechanism, such part in the present illustration being a hub projecting from the upper or outer face of the gear case cap, and adapted to surround the rotatable shaft to which the steering wheel is attached in the usual manner, there being formed in this hub a series of recesses 7 adapted to receive a locking bolt carried by the steering wheel. The parts of the locking mechanism just referred to are not shown, except the part 5, as the lock forms no part of the present invention and may be varied in construction and arrangement to suit the manufacturer or user. In using the usual "Ford" type steering mechanism it becomes necessary from time to time to remove the cap of the gear case in order to inspect and lubricate the gearing housed thereby. This is permitted by uniting the case and cap by screw threads. When a locking mechanism for the steering wheel, one part of which is carried by the cap of the gear case, is used, it becomes necessary to secure the cap to the case in such manner that it cannot be turned when the lock is in use, else the latter would be ineffective for its desired purpose. In the aforesaid application and patent there is illustrated one means for locking the cap to the gear case proper. The means there illustrated necessitated for their application the use of a hammer and a screw driver, and required that the person first applying the locking means should be possessed of considerable strength in the hands and arms. The present invention has for its purpose to provide means for locking the cap to the gear case, which may be applied by the use of a hammer alone, and which may be removed when it becomes desirable to take off the cap 4 to expose the gearing within the case 2. The locking means for uniting the gear case and its cap against relative rotative movement consists of pins 8, one or more of which may be used, preferably a plurality of them. The pins are adapted to be driven into apertures 9 formed therefor in the cap 4. These apertures extend through the top wall of the cap, near the peripheral edge thereof, and communicate with channels 6 cut through the screw threads in the skirt or depending flange of the gear cap, the channels being direct continuations of the apertures 9, and the two being produced at one cutting operation. The pins are angular in cross sections, at least as to three of their sides, and of uniform dimension, transversely, throughout their length. In Fig. 4 we show a pin that is square in cross section; while in Fig. 3 is shown a form of pin that we prefer to use, which is oblong in cross section and with that face which is outermost when the pin is seated in the recess 9, rounded, as indicated at 10. It will be seen that the aperture 9 through the top wall of the cap is of angular shape to fit the pin 8 and that it will operate to prevent rotation or turning of the pin and also to give proper direction thereto as it is being driven into place.

As represented in the drawings we prefer that the locking pin 8 should be of uniform size from end to end so that when driven into one of the apertures 9 it will be supported and guided so that its front cutting end shall overlie the edge of the case 2 and cut a kerf in the face thereof as the pin is driven downward and into the channel 6. The outer bearing wall of this channel holds the pin to its work and guides it, but does not tend to force it radially toward the axial center of the gear case 2, as would occur were the groove tapering or formed with an inwardly inclined bearing wall. By the arrangement shown the pin seat, formed by the two opposite channels 6 and 13, is of the same size from end to end, and closely fits the pin.

11 is an enlarged recess formed by cutting away the skirt of the cap 4 on its inner surface, this recess communicating with the inner or lower end of the channel 6 and extending to the lower edge of the skirt. We prefer that the cutting of the skirt of the cap to form the recesses 11 shall not disturb the outer wall of the flange or skirt of the gear cap or mar its lower edge, in order that it may not be apparent to one uninformed that such recesses have been formed. The purposes of these enlarged recesses is to permit a proper tool to be inserted from below, and between the engaging walls of the gear case and cap, to drive out the pins 8 when it is desired to remove them in order to permit the cap to be unscrewed from the case.

In practicing our invention the cap is screwed tightly to place on the gear case 2 as is usual, it being immaterial in what position the cap may come to rest. The keys 8 are then inserted in the recesses 9 and driven in until their outer ends are flush with the top of the cap. The pins 8 are of hard metal and the lower edges thereof are sharp and adapted to cut a kerf or channel in the softer metal of which the gear case may be formed, severing the screw-threads in so doing. When the pins have been driven to place they occupy seats which are formed in two registering channels, one, 6, being formed in the skirt of the cap 4, as has been described, and the other, 13, in the wall of the gear case, it being cut by the key when driven to place, as has just been set forth.

When the keys are to be removed, in order to free the cap 4, a tool is inserted from below through the recesses 11 and caused to engage with the lower ends of the keys which may then be driven out of their seats.

In order that the keys may be protected and covered so that they cannot be removed when the steering wheel is locked, we provide the hub 12 of the steering wheel, which is concentric with and movable relative to the projection 5 of the cap of the gear case, with an outwardly extending flange, which is represented as being broken to form the arms 14 which are so disposed that they are as close to the top of the cap 4 as it is practical to locate them and yet permit free movements of the hub and the flange which it carries relative to the cap. The arms 14 of the said flange are arranged so that they directly overlie the recesses 9 in the cap and the keys seated therein whenever the steering wheel occupies a position, relative to the gear case, that will permit the wheel to be locked. This makes it impossible for the keys to be removed so long as the arms occupy the positions over their exposed ends. When, however, the steering wheel is unlocked it may be turned to carry the arms 14 around and from over the pins, when the latter may be removed in the manner described.

The means which we have described and herein illustrated for securing a removable cap to a gear case are not only of simple construction and small cost, but they may be easily and quickly applied, requiring only the use of a hammer, and may be also easily removed whenever it is desired to free the cap so that it may be taken off the gear case to expose the gearing that it covers.

What we claim is:

1. The combination of a gear case, a cover therefor united to the gear case by screw threads, having a top and a concentric attachment that constitutes a part of a locking mechanism, means for preventing rotation of the cover relative to the gear case, comprising a locking pin passing through the top of the cover and seated in grooves formed respectively in the screw-threaded uniting portions of the gear case and cover, a wheel having a hub surrounding the concentric attachment of the cover adapted to be locked thereto, the wheel hub being formed with an outwardly extending flange that is located close to and directly over the top of the cover and is arranged to cover the exposed end of the locking pin when the wheel is in position to be locked, whereby access to the locking pin and its removal are prevented.

2. The combination with two concentrically arranged members fitted to each other closely, of a smooth locking pin for preventing relative rotation of such members seated in opposite registering grooves formed respectively in the two members and together forming a complete seat for the pin, the outer member having a top through which the locking pin passes and a skirt extending over the inner member beyond the inner end of the locking pin, the said skirt being cut away to form an enlarged recess opposite the inner end of the said locking pin, said recess extending to the lower edge of the skirt, whereby access may be had to the pin to drive it from its seat.

3. The combination of an open ended case for enclosing gearing, a cap covering the said case and having a skirt, the cap being united to the case by screw threads, locking pins which pass through openings in the top of the cap and are seated in grooves formed respectively in the screw threaded walls of the case and cap and operating to prevent rotation of the cap, and a rotatable hub overlying the gear cap arranged to be locked at will against rotation relative to such cap and connected with a manually operated wheel, the hub being provided with a flange that is broken to form arms which overlie the exposed ends of the connecting pins when the hub is locked but to expose the pins when the hub is free and moved to an intermediate position.

CLARENCE A. GODSHALK.
FREDERICK HENKE, Jr.